US012679911B2

(12) United States Patent
Zhou et al.

(10) Patent No.: US 12,679,911 B2
(45) Date of Patent: Jul. 14, 2026

(54) PREPARATION METHOD OF PTFE DISPERSION RESIN WITH CORE-SHELL STRUCTURE

(71) Applicants:ZHEJIANG JUHUA TECHNOLOGY CENTER CO., LTD., Quzhou (CN); ZHEJIANG JUSHENG FLUOROCHEMICAL CO., LTD., Quzhou (CN)

(72) Inventors: Liyang Zhou, Quzhou (CN); Zhenhua Chen, Quzhou (CN); Xiaoyong Zhou, Quzhou (CN); Shuhua Wang, Quzhou (CN)

(73) Assignees: ZHEJIANG JUHUA TECHNOLOGY CENTER CO., LTD., Quzhou (CN); ZHEJIANG JUSHENG FLUOROCHEMICAL CO., LTD., Quzhou (CN)

( * ) Notice: Subject to any disclaimer, the term of this patent is extended or adjusted under 35 U.S.C. 154(b) by 611 days.

(21) Appl. No.: 18/031,696

(22) PCT Filed: Feb. 8, 2021

(86) PCT No.: PCT/CN2021/076001

§ 371 (c)(1),
(2) Date: Apr. 13, 2023

(87) PCT Pub. No.: WO2022/083035

PCT Pub. Date: Apr. 28, 2022

(65) Prior Publication Data

US 2023/0383029 A1     Nov. 30, 2023

(30) Foreign Application Priority Data

Oct. 21, 2020     (CN) .......................... 202011130063.0

(51) Int. Cl.
| | |
|---|---|
| *C08F 2/26* | (2006.01) |
| *C08F 2/38* | (2006.01) |
| *C08F 214/26* | (2006.01) |
| *C08L 27/18* | (2006.01) |

(52) U.S. Cl.
CPC ............ *C08F 214/262* (2013.01); *C08F 2/26* (2013.01); *C08F 2/38* (2013.01); *C08L 27/18* (2013.01); *C08L 2201/08* (2013.01); *C08L 2201/54* (2013.01); *C08L 2203/18* (2013.01); *C08L 2207/53* (2013.01)

(58) Field of Classification Search
None
See application file for complete search history.

(56) References Cited

U.S. PATENT DOCUMENTS

| | | | |
|---|---|---|---|
| 4,038,230 A | 7/1977 | Mueller et al. | |
| 2010/0160510 A1 * | 6/2010 | Aten ....................... | C08F 14/18 524/544 |

FOREIGN PATENT DOCUMENTS

| | | |
|---|---|---|
| CN | 102264775 | 11/2011 |
| CN | 103201301 | 7/2013 |
| CN | 109776821 | 5/2019 |

* cited by examiner

*Primary Examiner* — Richard A. Huhn

(74) *Attorney, Agent, or Firm* — Li & Cai Intellectual Property Office

(57) ABSTRACT

Disclosed is a preparation method of a PTFE dispersion resin with a core-shell structure, including: adding a fluorine-containing hydrocarbon and a fluorine-containing modifying monomer as nucleating agents in an initial nucleating stage of polymerization, adding a small amount of a non-PFOA surfactant to regulate a particle core structure, and adding the same or different non-PFOA surfactant during a growth stage to stabilize a dispersion. The method can avoid the use of PFOA surfactants, consume less surfactants and achieve good emulsion stability. The PTFE dispersion resin thus prepared has a core-shell multilayer structure, low extrusion pressure, good thermal stability, and excellent mechanical properties, and is especially suitable for the preparation of small-diameter tubes by high-compression-ratio paste extrusion.

7 Claims, No Drawings

PREPARATION METHOD OF PTFE DISPERSION RESIN WITH CORE-SHELL STRUCTURE

This is a U.S. national stage application of PCT Application No. PCT/CN2021/076001 under 35 U.S.C. 371, filed Feb. 8, 2021 in Chinese, claiming priority of Chinese Application No. 202011130063.0, filed Oct. 21, 2020, all of which are hereby incorporated by reference.

BACKGROUND OF THE INVENTION

1. Technical Field

The invention belongs to the field of macromolecules, and in particular relates to a preparation method of a polytetrafluoroethylene (PTFE) dispersion resin with a core-shell structure.

2. Description of Related Art

PTFE, commonly known as the "King of Plastics", is the most commonly used fluoropolymer. With excellent chemical stability, corrosion resistance, sealability, high lubrication and non-stickiness, electrical insulation and good aging resistance, PTFE is widely used in national defense, aerospace, electronics, electrics, chemical industry, machinery, instruments, meters, construction, textile, metal surface treatment, pharmaceutical, medical, textile, food, metallurgical smelting and other fields.

The methods of producing PTFE resin usually include suspension method and dispersion method, and the resins thus prepared are called suspension resin and dispersion resin respectively. The dispersion resin refers to a tetrafluoroethylene (TFE) monomer, that is polymerized by dispersing into an emulsion state in the presence of an emulsifier. Dispersion polymerization involves two distinct stages: an initial nucleating stage in which a certain number of polymerization sites or cores are formed and a growth stage in which TFE monomers continue to polymerize on the surface of the formed cores, and as the polymerization proceeds, the size of latex particles gradually increases, and few or no new cores are formed at this stage. The preparation of high-solid dispersion generally requires the addition of fluorine-containing surfactants (emulsifiers) to stabilize the dispersion and prevent the aggregation and precipitation of polymer particles. In the above process, the nucleating stage of PTFE dispersion polymerization plays a decisive role in the morphology, size and number of primary particles of the resin, and will also directly affect the growth of subsequent particles in the growth stage. Reasonably controlling the particle structure in the nucleating stage can greatly improve the properties of the resin, especially affect the paste extrusion processing property of the resin, and for the preparation of a high-compression-ratio PTFE dispersion resin, it is even more important to reasonably control the particle structure during the nucleating stage. Therefore, the selection of emulsifiers is important. Usually, the emulsifiers used in TFE dispersion polymerization are mostly perfluorooctanoic acid and its salts, such as ammonium perfluorooctanoate (perfluorooctanoic acid substances are hereinafter referred to as PFOAs). Studies have shown that the perfluoroalkyl chains of PFOAs are degrade slowly and will accumulate in the environment and organisms, causing toxic hazards to the environment and the human body. PFOAs have been restricted in related products. By reducing the use and emission of PFOAs in the production process of fluoropolymers, the environmental problems caused by PFOAs can be gradually reduced, but the existence of PFOAs cannot be fundamentally eliminated. Therefore, finding an environmentally friendly emulsifier to replace PFOAs is the best solution to the problem of PFOAs, and it has gradually become a research topic in recent years.

One method is to use short-chain (usually a carbon chain has less than 8 carbon atoms) perfluorocarboxylic acid emulsifiers. In 2002, 3M Company developed perfluorobutanesulfonic acid (PFBS, referred to as C4). This product has no persistent bioaccumulation, and its degradation products are harmless. DuPont developed a six-carbon product (referred to as C6), and the biotoxicity of its degradation products is much lower than that of PFOA products, which meets the requirements of environmental restrictions. However, due to the short carbon chain of the above products, the achieved surface tension is not low enough, and their dispersion effect is far inferior to that of PFOA products. Therefore, in the industrial production of dispersions with high solid content, a large number of aggregates often appear during the polymerization process.

Another method is to introduce heteroatoms into the perfluorosurfactant molecule. Studies have shown that, in order to ensure the dispersion effect, an emulsifier used for TFE dispersion polymerization needs to be at least partially fluorinated. For example, by introducing hydrogen, oxygen, nitrogen and other atoms that are more easily degraded, "weak points" are introduced into the molecular chain to increase its degradability.

In the disclosed documents, the use of perfluoro/fluorine-containing ether carboxylic acids or salts with oxygen atoms in the main chain as TFE dispersion polymerization emulsifiers has been extensively studied. As disclosed in U.S. Pat. Nos. 3,271,341A, 3,391,099A, etc., perfluoroether carboxylic acids/salts were used to carry out dispersion polymerization of PTFE, but the stability of the emulsion was still not ideal, resulting in the generation of more aggregates. As disclosed in U.S. Pat. Nos. 7,671,112 and 7,776,946, fluorine-containing ether carboxylic acids/salts (such as perfluoro ammonium 2,6-dioxa octanoate) were used as emulsifiers for dispersion polymerization of TFE, but the solid content of the dispersion prepared by this method was only about 10 wt %, and no attempt was made for polymerization with a higher solid content.

As disclosed in U.S. Pat. No. 7,897,682B2, perfluorosurfactants (such as perfluoropolyether carboxylic acids/salts) and hydrocarbon surfactants were used in combination to carry out dispersion polymerization of PTFE to obtain a dispersion with satisfactory solid content and stable emulsion. However, although this method avoids the use of PFOA emulsifiers, this method is mainly used to develop melt-processable PTFE products such as TFE-PPVE (PFA) and TFE-HFP (FEP). This type of resin is mainly formed by melt processing, so it does not require the control over the primary particle structure of the dispersion. Therefore, this dispersion system is not suitable for the preparation of PTFE dispersion resin, especially not suitable for the preparation of high-compression-ratio PTFE dispersion resin by paste extrusion molding.

As disclosed in U.S. Pat. No. 7,705,074, fluoropolyether acids/salts with a molecular weight of at least about 800 g/mol and short-chain fluorosurfactants with a chain length of no more than 6 atoms (such as short-chain fluoroethanoate $C_2H_5OCF(CF_3)COONH_4$) were used in combination. As disclosed in U.S. Pat. No. 7,932,333, high-molecular-weight fluoropolyether acids/salts and low-molecular-weight fluoropolyether acids/salts were used in combination. The two methods both can effectively carry out the dispersion polymerization of TFE. Compared with using fluorine-containing surfactants or low-molecular-weight fluoropolyether acid/salt surfactants alone, this method can greatly reduce the generation of aggregates, but the solid content of PTFE emulsion prepared by this method still does not reach the expectation of industrial production.

In order to increase the degradability of fluorine-containing surfactants, many researchers used partially fluorinated fluorine-containing carboxylates or sulfonates for dispersion polymerization of TFE. As disclosed in U.S. Pat. Nos. 5,789,508, 5,688,884 and 4,380,618, fluorine-containing aliphatic sulfonate surfactants having a general formula of Rf-C$_2$H$_4$—SO$_3$M (representing perfluorinated aliphatic group in which M represents a cation) were used. However, the H atom on a terminal ethanesulfonic acid group of the emulsifier may cause a chain transfer reaction during the nucleating stage. As disclosed in U.S. Pat. No. 5,763,552, fluorine-containing alkyl carboxylates (having a general formula of Rf-(CH$_2$)n-R'f-COOM) containing alkylene in the main chain were used as emulsifiers, and the high-molecular-weight PTFE homopolymer resin prepared showed that the chain transfer efficiency of this type of emulsifier was low, and the influence on the molecular weight of the resin was negligible. However, the PTFE resin prepared by this method cannot be used for high-compression-ratio extrusion processing.

As also disclosed in a patent, a nucleating agent was added to induce the nucleating reaction of TFE in the nucleating stage of PTFE particles, and a non-PFOA surfactant was then added in the growth stage to keep the dispersion stable. As disclosed in Patent Application US2012116017, a water-soluble hydrocarbon-containing compound was added as a core site at the initial stage of polymerization, and another hydrocarbon-containing surfactant (such as SDS) was added at the stable stage of polymerization. The solid content of the dispersion prepared by this method still needs to be improved, and the dispersion stability of the system is not ideal, resulting in the formation of more aggregates in the case of a high solid content.

It thus can be seen that although there are many studies on PFOA substitution, compared with PFOA emulsifiers, various novel alternative dispersants have more or less various problems, such as use of a large amount of emulsifiers, but the emulsion still has problems such as poor stability, increased aggregates, and low solid content.

BRIEF SUMMARY OF THE INVENTION

An object of the invention is to provide a preparation method of a PTFE dispersed resin. This method can avoid the use of PFOA surfactants, consume less surfactants and achieve good emulsion stability. The PTFE dispersion resin thus prepared has a core-shell multilayer structure, low extrusion pressure, good thermal stability, and excellent mechanical properties, and is especially suitable for the preparation of small-diameter tubes by high-compression-ratio paste extrusion.

To solve the above technical problems, the invention adopts the following technical solutions:

A preparation method of a PTFE dispersion resin with a core-shell structure, comprising: adding a fluorine-containing hydrocarbon and a fluorine-containing modifying monomer as nucleating agents in an initial nucleating stage of polymerization, adding a small amount of a non-PFOA surfactant to regulate a particle core structure, and adding the same or different non-PFOA surfactant during a growth stage to stabilize a dispersion.

Preferably, specific steps are as follows.

(1) stage I: adding high-purity water to a polymerization reactor, adding the fluorine-containing hydrocarbon nucleating agent, the fluorine-containing modifying monomer, a stabilizer, and a small amount of the non-PFOA surfactant in sequence, and then introducing a TFE monomer to a certain pressure after qualified replacement; heating the solution to a reaction temperature, and dispersing the solution for a certain period of time with stirring, then adding an initiator to start a polymerization reaction; emptying and replacing the unreacted monomer and modifying monomer in the polymerization reactor to remove the modifying monomer as much as possible to complete the reaction in the nucleating stage;

(2) stage II: adding the TFE monomer to a certain pressure to enter a homopolymerization reaction in the growth stage, and adding the same or different non-PFOA surfactant at this stage to stabilize the dispersion, and keeping the reaction pressure constant by further adding the TFE;

(3) stage III: adding a chain transfer agent or adding the modifying monomer at the same time to continue the reaction until the end of the reaction; and (4) cooling the dispersion to remove the stabilizer and then carrying out post-treatment to obtain the PTFE dispersion resin.

The nucleating stage of dispersion polymerization is crucial to the whole reaction. The addition of the nucleating agent in the nucleating stage can induce the nucleating reaction of the TFE monomer, and under the synergistic dispersion effect of the fluorine-containing hydrocarbon nucleating agent, the requirements for surfactants can be greatly reduced, the use of surfactants can be reduced, and the particle size and distribution of particles in the nucleating stage can be well controlled. According to the invention, under the synergistic effect of the fluorine-containing hydrocarbon and the surfactant, the lipophilic part of the surfactant can effectively bind the fluorine-containing hydrocarbon, and the hydrophilic part of the surfactant can ensure that the lipophilic part and the nucleating site are uniformly dispersed and stable in an aqueous medium; and the fluorinated hydrocarbon, as a lipophilic nucleating site, can induce the nucleating reaction of TFE. Therefore, under the action of the fluorine-containing hydrocarbon, the requirements for surfactants in the dispersion polymerization of TFE are greatly reduced.

Preferably, the nucleating agent is a fluorine-containing olefin substance, such as a hydrochlorofluorocarbon (such as CH$_3$CClF$_2$, CH$_3$CCl$_2$F, CF$_3$CF$_2$CCl$_2$H, CF$_2$ClCF$_2$CFHCl, and the like); a chlorofluoroalkane (such as CF$_2$ClCFCl$_2$, CF$_2$ClCFClCF$_2$CF$_3$, CF$_3$CCFClCFClCF$_3$, and the like); and a perfluorocarbon (such as perfluorocyclobutane, perfluorobutane, perfluoropentane, perfluorohexane), wherein a perfluoroalkanes having no chain transfer effect is preferred.

Preferably, the nucleating agent is used in an amount of 0.01-2 wt %, preferably wt %, more preferably 0.1-1 wt %, of the reaction medium.

Preferably, the non-PFOA surfactant is one or more of a fluoroether acid or salt, a fluoroether sulfonic acid or salt, a fluoropolyether carboxylic acid or salt, a fluoropolyether sulfonic acid or salt, a hydrofluoroalkyl carboxylic acid or salt, a hydrofluoroalkyl sulfonic acid or salt, and a hydrocarbon-containing surfactant. The expression "hydrocarbon-containing" in this application means that a hydrogen atom on a carbon chain in the hydrocarbon surfactant can be substituted by fluorine or chlorine, and a hydrogen-unsubstituted hydrocarbon surfactant is preferred, such as sodium dodecyl sulfate (SDS), sodium octylsulfonate (SOS), sodium dodecylbenzenesulfonate (SDBS), and the like.

Preferably, the surfactant is added to the polymerization reactor in two steps, respectively in the nucleating stage and the growth stage, and the total amount of the surfactant added in two steps is controlled to be 0.05-0.6 wt %, preferably 0.06-0.3 wt %, more preferably of the reaction medium, wherein the amount of the surfactant added in the nucleating stage is 5-50 wt %, preferably 10-35 wt %, more preferably 15-25 wt %, of the total amount.

Preferably, the modifying monomer is a fluorine-containing vinyl monomer, such as PPVE, PEVE, PMVE, CTFE, HFP, VDF, PFBE and the like.

Preferably, the core-modifying monomer is perfluoroalkyl vinyl ether, preferably PPVE, and the content of the perfluoroalkyl vinyl ether is 0.02-0.5 wt %, preferably 0.03-0.3 wt %, more preferably 0.05-0.2 wt %, of the dispersion resin; the shell-modifying monomer is fluorinated olefin, preferably HFP and CTFE, and the content of the fluorinated olefin is preferably 0-0.4 wt %, more preferably 0-0.3 wt %, of the PTFE dispersion resin.

Preferably, stage I refers to a stage of reaction proceeding to 5-20 wt % of the total addition of TFE, and stage II refers to a stage of reaction proceeding to 80-95 wt % of the total addition of TFE.

Preferably, the PTFE dispersion resin with a core-shell structure has a core-shell-shell three-layer structure, wherein a core is made of a fluorine-containing olefin-modified PTFE, a middle shell is made of a high-molecular-weight PTFE homopolymer, and an outer shell is made of a lower-molecular-weight PTFE homopolymer or fluorine-containing olefin-modified PTFE.

Preferably, the polymerization initiator is well-known in the art. In the invention, a compound initiator system is preferred, such as a mixed system of ammonium persulfate and succinic acid peroxide.

Preferably, the content of the initiator used in the water medium is 50-150 ppm, wherein the mass ratio of ammonium persulfate to succinic acid peroxide is 0.03-0.1.

Preferably, the stabilizer is paraffin, and the amount of the stabilizer used is 4-5 wt % of the reaction medium.

Preferably, the chain transfer agent is selected from a group consisting of hydrogen gas, low-molecular alcohols and alkanes; the low-molecular alcohols include methanol and ethanol, and the alkanes include methane, ethane, and propane, preferably methanol.

Preferably, in stage III, the amount of the chain transfer agent used is 0.05-1 wt % of consumption of TFE.

Preferably, the reaction temperature is 10-100° C., preferably 40-90° C., more preferably 60-80° C.

Preferably, the reaction pressure is 0.5-3 Mpa, preferably 0.7-2.5 Mpa, more preferably 1.0-2.0 Mpa.

Preferably, the solid content of the dispersion is 10-60 wt %, preferably 20-55 wt %, most preferably 30-50 wt %.

With adoption of the above technical solution, the invention has the following beneficial effects.

The invention can avoid the use of PFOA surfactants, consume less surfactants and achieve good emulsion stability. The PTFE dispersion resin thus prepared has a core-shell multilayer structure, low extrusion pressure, good thermal stability, and excellent mechanical properties, and is especially suitable for the preparation of small-diameter tubes by high-compression-ratio paste extrusion. According to the invention, under the synergistic effect of the fluorine-containing hydrocarbon and the surfactant, the lipophilic part of the surfactant can effectively bind the fluorine-containing hydrocarbon, and the hydrophilic part of the surfactant can ensure that the lipophilic part and the nucleating site are uniformly dispersed and stable in an aqueous medium; and the fluorinated hydrocarbon, as a lipophilic nucleating site, can induce the nucleating reaction of TFE. Therefore, under the action of the fluorine-containing hydrocarbon, the requirements for surfactants in the dispersion polymerization of TFE are greatly reduced.

DETAILED DESCRIPTION OF THE INVENTION

The invention will be further described below in conjunction with specific embodiments.

Example 1

6.5 L of deionized water, 30 g of paraffin, 2 g of SDS, 10 g of octafluorocyclobutane, and 8 g of PPVE were added into a 1 L stainless steel vertical reactor (anchor paddle) after qualified replacement, and then stirred at 85 rpm. The reactor was heated to 70° C. The TFE monomer was added till the pressure of 2.0 MPa, and then stirred and dispersed for 10 min. 20 g of an aqueous solution of an initiator containing 0.03 g of ammonium persulfate and 0.6 g of succinic acid peroxide was then added to react. The TFE monomer was added to keep the pressure of the polymerization reactor at 2.0 MPa. When the reaction proceeded to the consumption of TFE being 250 g, the stirring was stopped, and the pressure in the polymerization reactor was released to 0.05 MPa to finish the reaction of the nucleating stage. The TFE monomer was further introduced with stirring till the reaction pressure of 2.0 Mpa, and 20 ml of the aqueous solution containing 7 g of SDS was added at the same time. The polymerization pressure was kept stable at 2.0 Mpa by adding the TFE monomer. When the reaction proceeded to the consumption of TFE being 2400 g, 6 g of PPVE and 1 g of methanol were added to the polymerization reactor to continue the reaction until the consumption of TFE monomer reached 3000 g, the reaction then ended, the reaction system was cooled and the stirring was stopped. The emulsified dispersion of the obtained TFE copolymer was cooled, the supernatant paraffin was removed, and the dispersion was filtered through a filter bag to remove about 3 g of aggregates. The dispersion was diluted with pure water to a concentration of 15 wt %. The diluted dispersion was adjusted to 30° C. and stirred vigorously to obtain wet micropowder. The wet micropowder was sieved on a vibrating sieve, and then dried at 150° C. for 20 h.

Example 2

6.5 L of deionized water, 30 g of paraffin, 1.5 g of SDBS, 20 g of octafluorocyclobutane, and 5 g of PPVE were added into a 1 L stainless steel vertical reactor (anchor paddle) after qualified replacement, and then stirred at 85 rpm. The reactor was heated to 70° C. The TFE monomer was added till the pressure of 1.5 MPa, and then stirred and dispersed for 10 min. 20 g of an aqueous solution of an initiator containing 0.03 g of ammonium persulfate and 0.6 g of succinic acid peroxide was then added to react. The TFE monomer was added to keep the pressure of the polymerization reactor at 1.8 MPa. When the reaction proceeded to the consumption of TFE being 600 g, the stirring was stopped, and the pressure in the polymerization reactor was released to 0.05 MPa to finish the reaction of the nucleating stage. The TFE monomer was further introduced with stirring till the reaction pressure of 1.8 Mpa, and 20 ml of the aqueous solution containing 6.5 g of SDBS was added at the same time. The polymerization pressure was kept stable at 1.5 Mpa by adding the TFE monomer. When the reaction proceeded to the consumption of TFE being 2600 g, 2 g of methanol was added to the polymerization reactor to continue the reaction until the consumption of TFE monomer reached 3000 g, the reaction then ended, the reaction system was cooled and the stirring was stopped. The emulsified dispersion of the obtained TFE copolymer was cooled, the supernatant paraffin was removed, and the dispersion was filtered through a filter bag to remove about 2.5 g of aggregates. The dispersion was diluted with pure water to a concentration of 15 wt %. The diluted dispersion was adjusted to 30° C. and stirred vigorously to obtain wet micropowder. The wet micropowder was sieved on a vibrating sieve, and then dried at 150° C. for 20 h.

Example 3

6.5 L of deionized water, 30 g of paraffin, 1 g of SDS, 25 g of octafluorocyclobutane, and 8 g of PPVE were added into a 1 L stainless steel vertical reactor (anchor paddle) after qualified replacement, and then stirred at 85 rpm. The reactor was heated to 70° C. The TFE monomer was added till the pressure of 2.0 MPa, and then stirred and dispersed for 10 min. 20 g of an aqueous solution of an initiator containing 0.03 g of ammonium persulfate and 0.6 g of succinic acid peroxide was then added to react. The TFE monomer was added to keep the pressure of the polymerization reactor at 1.5 MPa. When the reaction proceeded to the consumption of TFE being 400 g, the stirring was stopped, and the pressure in the polymerization reactor was released to 0.05 MPa to finish the reaction of the nucleating stage. The TFE monomer was further introduced with stirring till the reaction pressure of 1.5 Mpa, and 20 ml of the aqueous solution containing 6 g of SDS was added at the same time. The polymerization pressure was kept stable at 1.5 Mpa by adding the TFE monomer. When the reaction proceeded to the consumption of TFE being 2700 g, 4 g of HFP and 1 g of methanol were added to the polymerization reactor to continue the reaction until the consumption of TFE monomer reached 3000 g, the reaction then ended, the reaction system was cooled and the stirring was stopped. The emulsified dispersion of the obtained TFE copolymer was cooled, the supernatant paraffin was removed, and the dispersion was filtered through a filter bag to remove about 4.8 g of aggregates. The dispersion was diluted with pure water to a concentration of 15 wt %. The diluted dispersion was adjusted to 30° C. and stirred vigorously to obtain wet micropowder. The wet micropowder was sieved on a vibrating sieve, and then dried at 150° C. for 20 h.

Comparative Example 1

6.5 L of deionized water, 30 g of paraffin, 2 g of PFOA, and 8 g of PPVE were added into a 1 L stainless steel vertical reactor (anchor paddle) after qualified replacement, and then stirred at 85 rpm. The reactor was heated to 70° C. The TFE monomer was added till the pressure of 2.0 MPa, and then stirred and dispersed for 10 min. 20 g of an aqueous solution of an initiator containing 0.03 g of ammonium persulfate and 0.6 g of succinic acid peroxide was then added to react. The TFE monomer was added to keep the pressure of the polymerization reactor at 2.0 MPa. When the reaction proceeded to the consumption of TFE being 250 g, the stirring was stopped, and the pressure in the polymerization reactor was released to 0.05 MPa to finish the reaction of the nucleating stage. The TFE monomer was further introduced with stirring till the reaction pressure of 2.0 Mpa, and 20 ml of the aqueous solution containing 7 g of PFOA was added at the same time. The polymerization pressure was kept stable at 2.0 Mpa by adding the TFE monomer. When the reaction proceeded to the consumption of TFE being 2400 g, 6 g of PPVE and 1 g of methanol were added to the polymerization reactor to continue the reaction until the consumption of TFE monomer reached 3000 g, the reaction then ended, the reaction system was cooled and the stirring was stopped. The emulsified dispersion of the obtained TFE copolymer was cooled, the supernatant paraffin was removed, and the dispersion was filtered through a filter bag to remove about 1.7 g of aggregates. The dispersion was diluted with pure water to a concentration of 15 wt %. The diluted dispersion was adjusted to 30° C. and stirred vigorously to obtain wet micropowder. The wet micropowder was sieved on a vibrating sieve, and then dried at 150° C. for 20 h.

Comparative Example 2

Similar to Example 1, the only difference was that no octafluorocyclobutane nucleating agent was added, and the obtained dispersion was filtered through a filter bag to remove about 1524 g of aggregates.

The relevant data of the PTFE dispersions obtained in the above-mentioned Examples 1-3 and Comparative Examples 1-2 were shown in Table 1, and the structure and property testing results of the resins obtained after agglomeration were shown in Table 2.

Specific Test Method:

The test method of the invention was as follows:

The structural properties of the resin were mainly characterized by the solid content, the unit content of the modifying monomer in the copolymer, the average primary particle size, the apparent density, and the standard specific gravity. The processability of the resin was characterized by paste extrusion pressure, tensile strength and elongation at break.

(1) Solid Content 10 g of the modified PTFE aqueous dispersion was taken from a petri dish, heated at 150° C. for about 3 h and then weighed. According to the obtained weight of the solid component, the ratio of the weight of the solid component to the weight of the modified PTFE aqueous dispersion was calculated as the solid content of the polymer.

(2) Average Primary Particle Size

The average primary particle size was tested by using a Malvern Mastersizer.

(3) Modifying Monomer Content of Copolymer

The high-compression-ratio PTFE dispersion resin powder was extruded to form a film disk, and the infrared absorbance of the film disk was determined to obtain the modifying monomer content. If the modifying monomer was chlorotrifluoroethylene (CTFE), the content was obtained by multiplying the ratio of absorbance at 957 $cm^{-1}$/absorbance at 2360 $cm^{-1}$ by 0.58. If the modifying monomer was PPVE (perfluoropropyl vinyl ether), the content was obtained by multiplying the ratio of absorbance at 995 $cm^{-1}$/absorbance at 935 $cm^{-1}$ by 0.14. If the modified monomer was HFP (hexafluoropropylene), the content was obtained by multiplying the ratio of absorbance at 982 $cm^{-1}$/absorbance at 935 $cm^{-1}$ by 0.3.

(4) Standard Specific Gravity (SSG)

12.0 g of the resin was weighed, and held at a pressure of 34.5 MPa for 2 min in a cylindrical mold with an inner diameter of 28.6 mm. The resin was then heated in a 290° C. furnace at a rate of 120° C./hr and held at 380° C. for 30 min, and then cooled at a rate of 60° C./h and held at 294° C. for 24 min. Next, the resin was held in a desiccator at 23° C. for 12 h, and the specific gravity value of the molded product to water at 23° C. was then determined as a standard specific gravity. Under the condition of the same modifying monomer content, the smaller the standard specific gravity, the larger the molecular weight.

(5) Paste Extrusion Pressure 226.8 g of polymer powder and 43.2 g of a hydrocarbon lubricant were mixed in a glass bottle and then subjected to aging treatment at room temperature (25° C.) for 8 h or more. Then, the above mixture was put into a stainless steel mold with an inner diameter of 39.4 mm, and a load of 55 kg was applied to a piston inserted into the mold, and held for 2 min. The above mixture was then taken out from the mold, put into a die (with a die angle of 20 degrees and a die hole diameter of 0.27 mm) attached to the mold (with an inner diameter of 40.3 mm), and extruded at a punch speed of 20 mm/min and a mold temperature of 40° C. to obtain ribbons. RR here refers to the ratio of the cross-sectional area (Ac) of the die of the extruder/the cross-sectional area (Ad) of the die, that is, RR=Ac/Ad. The value obtained by dividing the extrusion force of the portion in an equilibrium state by the cross-sectional area of the die was used as the pressure in the later stage of extrusion, and the paste extrusion pressure (MPa) was then obtained.

(6) Tensile Strength

Using a universal precision material testing machine, tensile samples were stretched at room temperature at a tensile speed of 200 mm/min, and then the maximum tensile strength was determined. In addition, the molded body for determination was produced as follows: 50.00 g of the modified PTFE powder and 10.25 g of an extrusion aid were mixed in a glass bottle and aged at room temperature for one hour. The resulting mixture was placed into a barrel of the extruder at room temperature under a pressure of 2 MPa and held for 1 min. A load of 5.7 MPa was then immediately applied to a plunger inserted into the barrel to extrude the raw material mixture from the die hole at a plunger speed of 20 mm/min (RR=400), and perform molding, thus obtaining a cylindrical molded body with a diameter of 0.63 mm and a length of mm, and the raw material of the molded body was sintered to obtain a tensile strength test sample.

(7) Elongation at Break

The elongation at break test sample was the same as the tensile strength test sample and tested by using a tensile testing machine. The chuck distance was adjusted to 40 mm to clamp the sample up and down, and an upper chuck was lifted at a speed of 20 mm/min and then stopped at the breakage moment of the sample. The elongation at break was calculated from the position of the chuck at this time.

$$\text{Elongation at break} = (\text{distance of chuck at break}/40\text{ mm}) \times 100\%$$

TABLE 1

| No. | Nucleating agent | | | Dispersant | | Dispersion | | | | |
| | | | | | | Solid | | | Aggregates | |
| | Name | Dose/g | | Name | Dose | content/% | D50/nm | | Weight/g | Proportion/% |
|---|---|---|---|---|---|---|---|---|---|---|
| Example 1 | Octafluorocyclobutane | 10 | | SDS | 10 | 31.17 | 249 | | 3 | 0.11 |
| Example 2 | Octafluorocyclobutane | 20 | | SDBS | 8 | 31.24 | 258 | | 2.5 | 0.10 |
| Example 3 | Octafluorocyclobutane | 25 | | SDS | 7 | 30.96 | 263 | | 4.8 | 0.17 |
| Comparative Example 1 | None | — | | PFOA | 10 | 31.57 | 243 | | 1.7 | 0.06 |
| Comparative Example 2 | None | — | | SDS | 10 | 18.41 | 323 | | 1524 | 50.8 |

TABLE 2

| No. | Modifying monomer | Content/wt % | Tensile strength/Mpa | Elongation at break/% | Thermal stability index | SSG | Extrusion pressure/Mpa* | Extrusion appearance |
|---|---|---|---|---|---|---|---|---|
| Example 1 | PPVE | 0.019 | 34.1 | 510 | 15 | 2.176 | 27 | Smooth and straight |
| Example 2 | PPVE | 0.013 | 36.5 | 420 | 6 | 2.179 | 38 | Smooth and straight |
| Example 3 | PPVE/HFP | 0.014/0.005 | 33.7 | 502 | 13 | 2.172 | 25 | Smooth and straight |
| Comparative Example 1 | PPVE | 0.018 | 35.2 | 513 | 20 | 2.172 | 26 | Smooth and straight |
| Comparative Example 2 | PPVE | 0.020 | 29.2 | 460 | 67 | 2.181 | 64 | Not smooth but straight |

*Extrusion pressure is 2000:1

As can be seen from Table 1 and Table 2, the PTFE dispersion resin prepared by the dispersion system of the invention and the PTFE dispersion resin prepared by using PFOA emulsifiers had similar dispersion liquid and resin properties.

The above are only specific embodiments of the invention, but the technical features of the invention are not limited thereto. Any simple changes, equivalent replacements or modifications based on the invention to solve basically the same technical problems and achieve basically the same technical effects are covered by the scope of the invention.

What is claimed is:

1. A preparation method of a polytetrafluoroethylene (PTFE) dispersion resin with a core-shell structure, comprising the following steps:

(1) stage I: adding water to a polymerization reactor, adding a fluorine-containing hydrocarbon nucleating agent, a fluorine-containing modifying monomer, a stabilizer, and a non-perfluorooctanoic acid (non-PFOA) surfactant in sequence, and then introducing a TFE monomer to form a solution; heating the solution to a reaction temperature, and dispersing the solution with stirring, then adding an initiator to start a polymerization reaction; emptying and replacing the unreacted monomer and modifying monomer in the polymerization reactor to remove the fluorine-containing modifying monomer to complete the reaction in a nucleating stage;

(2) stage II: adding the tetrafluoroethylene (TFE) monomer to a certain pressure to enter a homopolymerization reaction in a growth stage, and adding the same or different non-PFOA surfactant at this stage to stabilize the dispersion, and keeping the reaction pressure constant by further adding the TFE;

(3) stage III: adding a chain transfer agent or adding the fluorine-containing modifying monomer at the same time to continue the reaction until the end of the reaction; and (4) cooling the dispersion to remove the stabilizer and then carrying out post-treatment to obtain the PTFE dispersion resin;

wherein the non-PFOA surfactant is one or more of a fluoroether acid or salt, a fluoroether sulfonic acid or salt, a fluoropolyether carboxylic acid or salt, a fluoropolyether sulfonic acid or salt, a hydrofluoroalkyl carboxylic acid or salt, a hydrofluoroalkyl sulfonic acid or salt, and a hydrocarbon-containing surfactant.

2. The preparation method of a PTFE dispersion resin with a core-shell structure according to claim 1, wherein the nucleating agent is used in an amount of 0.01-2 wt % of the solution.

3. The preparation method of a PTFE dispersion resin with a core-shell structure according to claim 1, wherein the non-PFOA surfactant is added to the polymerization reactor in two steps, respectively in the nucleating stage and the growth stage, and the total amount of the non-PFOA surfactant added in two steps is controlled to be 0.05-0.6 wt % of the solution, wherein the amount of the non-PFOA surfactant added in the nucleating stage is 5-50 wt % of the total amount of the non-PFOA surfactant added.

4. The preparation method of a PTFE dispersion resin with a core-shell structure according to claim 1, wherein the fluorine-containing modifying monomer is a fluorine-containing vinyl monomer and comprises a core-modifying monomer and a shell-modifying monomer.

5. The preparation method of a PTFE dispersion resin with a core-shell structure according to claim 4, wherein the core-modifying monomer is perfluoroalkyl vinyl ether, and the content of the perfluoroalkyl vinyl ether is 0.02-0.5 wt %; the shell-modifying monomer is fluorinated olefin, and the content of the fluorinated olefin is 0-0.5 wt % of the PTFE dispersion resin.

6. The preparation method of a PTFE dispersion resin with a core-shell structure according to claim 1, wherein the stage I refers to a stage of reaction proceeding to 5-20 wt % of the total addition of TFE, and the stage II refers to a stage of reaction proceeding to 80-95 wt % of the total addition of TFE.

7. The preparation method of a PTFE dispersion resin with a core-shell structure according to claim 1, wherein the PTFE dispersion resin with a core-shell structure has a core-shell-shell three-layer structure, wherein a core is made of a fluorine-containing olefin-modified PTFE, a middle shell is made of a PTFE homopolymer, and an outer shell is made of a lower-molecular-weight PTFE homopolymer or fluorine-containing olefin-modified PTFE.

* * * * *